United States Patent
Garibaldi et al.

(10) Patent No.: US 10,183,651 B2
(45) Date of Patent: Jan. 22, 2019

(54) WIPER AND WIPER ASSEMBLY INCLUDING SUCH A WIPER

(71) Applicant: Valeo Systèmes d'Essuyage, Le Mesnil Saint Denis (FR)

(72) Inventors: Vincent Garibaldi, Issoire (FR); Vincent Gaucher, Ennezat (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 305 days.

(21) Appl. No.: 15/099,769

(22) Filed: Apr. 15, 2016

(65) Prior Publication Data
US 2016/0304063 A1 Oct. 20, 2016

(30) Foreign Application Priority Data
Apr. 17, 2015 (FR) ...................... 15 53472

(51) Int. Cl.
*B60S 1/40* (2006.01)
*B60S 1/38* (2006.01)
*B60S 1/34* (2006.01)

(52) U.S. Cl.
CPC .............. *B60S 1/40* (2013.01); *B60S 1/3872* (2013.01); *B60S 1/3874* (2013.01); *B60S 1/3427* (2013.01); *B60S 2001/3825* (2013.01)

(58) Field of Classification Search
CPC ................. B60S 2001/3825; B60S 1/3872
See application file for complete search history.

(56) References Cited

U.S. PATENT DOCUMENTS 3,387,316 A * 6/1968 Pearse ................. B60S 1/32
15/250.34

| | | | |
|---|---|---|---|
| 2011/0005019 A1* | 1/2011 | Boland | B60S 1/3436 15/250.32 |
| 2012/0036671 A1* | 2/2012 | Boland | B60S 1/583 15/250.32 |
| 2013/0097799 A1 | 4/2013 | Friscioni | |
| 2014/0230174 A1* | 8/2014 | Bommer | B60S 1/381 15/250.04 |

FOREIGN PATENT DOCUMENTS

| | | |
|---|---|---|
| DE | 102011078108 A1 | 12/2012 |
| DE | 102011082676 A1 | 3/2013 |
| FR | 2923785 A1 | 4/2013 |
| KR | 100782794 B1 | 12/2007 |

OTHER PUBLICATIONS

DE102011082676A1 (machine translation), 2013.*
Search Report issued in corresponding French Application No. 1553472; dated Feb. 17, 2016 (7 Pages).

* cited by examiner

*Primary Examiner* — Andrew A Horton
(74) *Attorney, Agent, or Firm* — Osha Liang LLP

(57) ABSTRACT

The invention relates to a wiper (2) of a window of a motor vehicle, comprising a wiper portion (12) and a connection portion (14) to a drive mechanism (4, 6) of the wiper, said wiper portion comprising a supporting element (16) that is attached to a wiper blade (20) of the window and that contains a stiffening element (18) of the wiper. According to one feature of the invention, the connection portion (14) is arranged as an extension of a proximal axial extremity (8) of the wiper portion.

The invention also relates to a wiper assembly having a drive head (4) mounted on a motorised drive shaft (6), and a wiper (2) as described above.

16 Claims, 2 Drawing Sheets

WIPER AND WIPER ASSEMBLY INCLUDING SUCH A WIPER

The present invention relates to a wiper for a window of a motor vehicle, as well as a wiper assembly incorporating such a wiper.

There is currently wiper technology for vehicle windows known as flat blade, an example embodiment of which is described in patent application FR2923785 filed by the applicant. This flat-blade technology generally comprises a structure built about a one-piece longitudinal component forming a semi-rigid flexible plastic supporting element comprising firstly a cavity designed to receive a stiffening element of the wiper, generally in the form of an elongate elastic metal strip, also referred to as the vertebra, and secondly a claw holding the elastomer wiper blade. In the aforementioned patent application, the one-piece component is rigidly connected to a central connector enabling the link with the drive mechanism of the wiper. This represents a conventional structure for a windscreen wiper assembly.

When addressing the wiping of the windows of a motor vehicle, although the focus is often placed on wiping the windscreen, wiping the rear window of a motor vehicle can also be addressed. This type of wiper is not mandatory, but it is particularly beneficial since it provides the driver with a clear view of the traffic behind the vehicle and when reversing.

Whether a wiper is used for a windscreen or for a rear window, the wear of the wiper blades requires same to be replaced several times during the service life of the vehicle, and designers aim to provide wiper assemblies that are optimised to facilitate assembly and disassembly by the vehicle user.

With this in mind, the invention relates to a wiper of a window of a motor vehicle, comprising a wiper portion and a connection portion to a drive mechanism of the wiper, said wiper portion comprising a supporting element that is attached to a wiper blade of the window and that contains a stiffening element of the wiper. According to one feature of the invention, the connection portion is arranged as an extension of a proximal axial extremity of the wiper portion.

Thus, a wiper according to the invention permits the use of a flat-blade structure, which is beneficial in terms of design and rigidity, with drive means at the end of the supporting element, to be applied notably to rear-window wiper assemblies.

According to one feature of the invention, the stiffening element of the wiper is a rod preformed to have a substantially flat first portion that can be seated in the supporting element in the wiper portion of the wiper, and a second portion that extends the axial extremity of the first portion and that forms said connection portion between said wiper and said drive head.

Thus, the axial extension forming the connection portion is provided by the stiffening element of the wiper itself. In this case, the second portion of the stiffening element of the wiper preferably includes a spring arm and an attachment wall that extends substantially parallel to the wiper portion of the wiper. The function of this spring arm is to press the wiper downwards when the wiper is attached to the related drive mechanism.

According to different features of the invention, taken individually or in combination with an embodiment of the wiper:

the spring arm is the stiffening element of the wiper, folded about itself such that the second portion of the stiffening element of the wiper is "S" shaped, the spring arm includes, after the flat first portion, a first curved return portion that is extended by an intermediate wall partially overlapping said flat first portion, the opposite extremity of said intermediate wall having a second curved return portion that is extended by the attachment wall to the drive head, the intermediate wall being arranged between the first portion of the stiffening element of the wiper and the attachment wall, the second portion of the stiffening element of the wiper is oriented such that the intermediate wall and the attachment wall are arranged on the side of the stiffening element of the wiper that is opposite the wiper blade.

According to other features of the invention, taken individually or in combination with another embodiment of the wiper:

the spring arm is an oblique branch, axially linking the first portion of the stiffening element of the wiper and the attachment portion to the drive head, the oblique branch has an incline in relation to the plane containing the attachment portion, with an angle substantially equal to 45°.

In these different embodiments, the stiffening element of the wiper may have, at one of the axial extremities of same, attachment means to the drive head. The attachment means may comprise a notch formed in the attachment wall of the connection portion.

According to other features of the invention:

at a distal extremity of the wiper opposite said proximal extremity, the blade and the stiffening element of the wiper have axial extremities positioned substantially facing one another, and an assembly fitting attaches the blade and the stiffening element or elements to said distal extremity, the supporting element is made of semi-rigid plastic(s), preferably extruded plastic(s), the supporting element includes at least one cavity, containing the stiffening element of the wiper, and a claw holding the wiper blade, the cavity and the claw extending longitudinally along the entire length of the supporting element, with the claw extending in line with the cavity, the cavity has a substantially rectangular cross section that fits the cross section of the stiffening element of the wiper, the claw comprises two legs that are formed from a wall of the supporting element and whose free extremities extend perpendicular towards the inside of the claw.

The invention also relates to a wiper assembly having a wiper as described above and a drive head mounted on a motorised drive shaft. According to the invention, the connection portion axially extending the wiper is designed to cooperate with the complementary attachment means of the drive head.

The fact that the wiper is attached to the drive head using the stiffening element of the wiper and that same incorporates an arm providing a spring function enables wiper assemblies, notably for rear windows, in which the wiper is correctly pressed against the window, thereby ensuring that the blade is in contact with the window as much as possible, in order to optimise the wiping function.

According to one feature of the invention, the spring arm that axially extends the wiper is "S" shaped, such that the wiper extends at least partially in line with and beneath the drive head. The wiper can thus wipe a zone of the window that was not previously accessible in designs in which the wiper is connected to the drive mechanism at one of the axial extremities of same.

According to different features relating to the drive head, the drive head may include an axial body for receiving the drive shaft as well as a lateral arm radially extending the axial body and having a receiving seat for the proximal longitudinal extremity of the stiffening element of the wiper. A clip is provided inside the receiving seat to cooperate with the transverse notch in the extremity of the stiffening element of the wiper. The axial body may also have a leg diametrically opposite the lateral arm. This enables the stop formed by the leg to compensate torque created by the spring effect of the arm.

According to a feature of the invention, the clip irreversibly attaches the wiper in the drive head. In after-sales service, the wiper is replaced by disassembly the assembly including the wiper and the drive head.

Other features and advantages of the invention are given in the detailed description of an embodiment below, provided with reference to the attached figures, in which.

As shown in the figures, the wiper assembly according to the invention includes a wiper 2 and a drive head 4.

In such a wiper assembly, the wiper is moved in relation to a window of the vehicle by a drive mechanism in which the drive head is driven in rotation by a drive shaft 6 that is for example mounted at the output of an electric motor (not shown).

The wiper assembly is advantageously designed to be positioned on the vehicle such that the wiper, when idle, is substantially horizontal, for example along a lower edge of the window. When in operation, it pivots in a to-and-fro motion between said idle position and a position angularly offset from said idle position in order to wipe the target zone.

Figure 1:
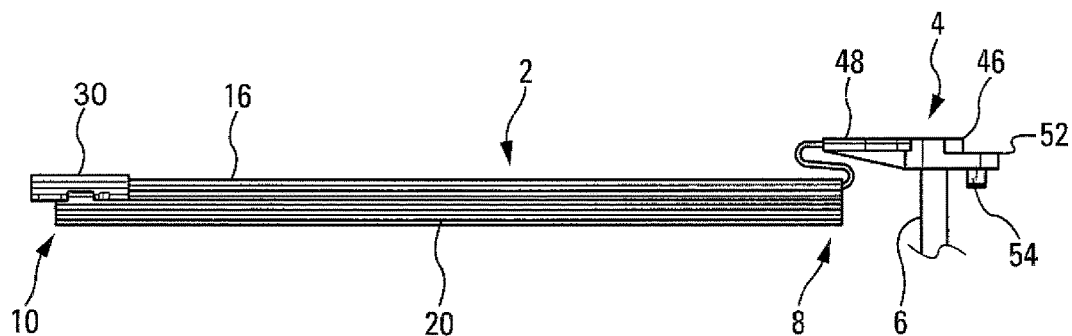
FIG. 1 is a front view of a wiper assembly according to the invention.

The wiper 2 has a proximal extremity 8 linked to the drive head 4 and a free distal extremity 10, as shown in FIG. 1.

Figure 4:
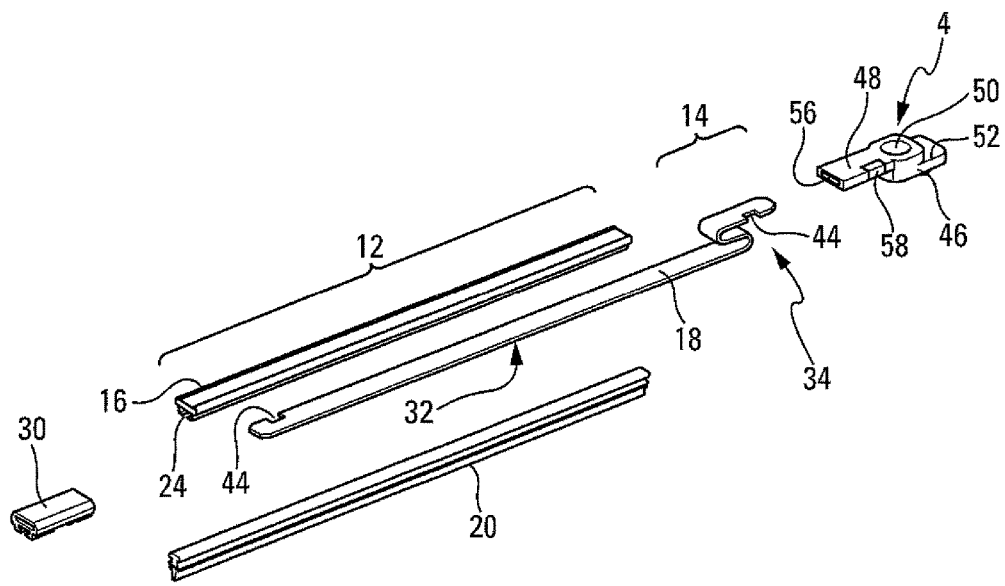
FIG. 4 is an exploded perspective view of the different components of the wiper assembly according to the first embodiment shown in FIG. 1.

The wiper includes a wiper portion 12 and a connection portion 14 to the drive head 4, as shown in FIG. 4, said connection portion being arranged as an extension of an axial extremity of the wiper portion.

The wiper portion 12 includes a longitudinal supporting element 16, a stiffening element 18 and a wiper blade 20.

The supporting element 16 comprises, according to flat-blade technology, firstly at least one cavity 22 that is designed to receive the stiffening element 18 of the wiper, and secondly a claw 24 holding the wiper blade 20.

The cavity and the claw extend longitudinally along the entire length of the supporting element, and the claw 24 extends in line A with the cavity 22, projecting from one of the walls delimiting the contours of the cavity, hereinafter referred to as the inner wall in relation to the position of the wiper when same is pressed against the window to be wiped.

The cavity 22 has a cross section that fits the cross section of the stiffening element 18 of the wiper such that same can be inserted in the cavity along the entire length of the supporting element 16.

The claw 24 comprises two legs that are formed from the inner wall of the supporting element such as to project substantially perpendicular from said wall, and the free extremities of same extend perpendicular towards the inside of the claw such as to reduce the mouth of the claw and to enable the wiper blade to be held inside the claw.

The supporting element 16 is made of semi-rigid plastic(s), preferably extruded plastic(s), while the stiffening element 18 of the wiper seated in the cavity of the supporting element is made of metal and the wiper blade 20 held by the claw is made of an elastomer.

The wiper blade 20 has a continuous longitudinal shape in which, in cross section, a thicker portion acts as a base for a flange that narrows towards the free extremity of same. The shape of the base portion is designed to be seated and held in the claw and the flange is designed to project beyond the claw such that the wiper blade, when the wiper is mounted on the vehicle, bears via this flange against an external face of the window of the vehicle. The window mentioned as an example of a window wiped by the wiper system according to the invention is in this case a rear window, but naturally this window could be a windscreen of the vehicle and in general any window of a motor vehicle whose surface can be wiped by a wiper system.

Although a single vertebra is used in the embodiment illustrated, two vertebrae superposed one on top of the other can be provided in a single cavity or in two cavities arranged one on top of the other. The vertebra or vertebrae form stiffening elements for the wiper and they extend along same to support the blade along the entire length of same.

While at the distal extremity 10 of the wiper, the blade and the stiffening element of the wiper have axial extremities positioned substantially facing one another beyond the extremity of the supporting element, and an assembly fitting 30 enables the blade and the stiffening element or elements to be rigidly connected at these axial extremities, it can be seen that according to the invention, at the proximal extremity 8 of the wiper, the stiffening element 18 of the wiper extends axially beyond the corresponding axial extremity of the blade 20, such that same is rigidly connected to the drive head 4, as detailed below.

The stiffening element 18 of the wiper is a rod preformed such that it has a substantially flat first portion 32 with a section that fits the section of the cavity, in this case a rectangular section, that is able to stiffen the supporting element and hold the wiper blade, and a second portion that extends the axial extremity of the first stiffening portion 32 and that is arranged to form the connection portion 14 between the wiper and the drive head.

The connection portion has an arm 34 designed to provide a spring effect that can press the wiper against the window and an attachment wall 35 to the drive head that forms an axial extension of the arm.

In a first embodiment, shown notably in FIG. 4, the arm providing a spring function has two curved return portions separated by an intermediate wall, such that the connection portion is in this case "S" shaped. Beyond the flat first portion 32, a first return portion 36 is formed by bending the stiffening element of the wiper about itself along a first transverse fold line contained within the plane defined by the stiffening element of the wiper. The shape of this first return portion in the vertical axial cross sectional plane is a semi-circle that is extended by an intermediate wall 38 that is thereby oriented such as to partially overlap the flat first portion of the stiffening element of the wiper. The opposite extremity of the intermediate wall has a second return portion 40 that is also formed by folding the stiffening element of the wiper about itself along a second fold line parallel to the first fold line and that is extended by the attachment wall 35 to the drive head, which is arranged in a plane substantially parallel to the plane defined by the first portion of the stiffening element of the wiper. The second curved portion also has a semi-circular shape oriented to extend away from the stiffening element of the wiper, such that the intermediate wall is arranged between the first portion of the stiffening element of the wiper and the attachment wall. The curved portions are also oriented such that the intermediate wall and the attachment wall are arranged on the side of the stiffening element of the wiper that is opposite the wiper blade. Thus, when the blade and the stiffening element of the wiper are in position in the supporting element, the second portion extends above the rest of the wiper, the attachment wall extending partially in line with the proximal axial extremity of the blade.

The size of the intermediate wall and the incline of same in relation to the first portion of the stiffening element of the wiper, when the wiper is not under stress, are dimensioned to flex the arm between the blade and the drive head, such that said arm can transmit a force to the wiper towards the window and ensure effective wiping.

When in operation, if the wiper loses contact with the window, in which case the blade is no longer in contact with the window, the wiper tends simultaneously to move towards the drive head, in a direction perpendicular to the window, substantially parallel to the direction of the drive shaft. The connection portion is then compressed in this direction against the drive head, through the flattening of the curved return portions.

Firstly the elasticity of the material used to make the stiffening element of the wiper, and secondly the fold made so that the flat walls of this connection portion, i.e. the attachment wall and the intermediate wall, extend in transverse planes parallel to the plane defined by the first portion of the stiffening element of the wiper, then generate an optimised spring effect that in reaction tends to return the stiffening element of the wiper to the original shape of same, therefore tending to return the blade to the initial position of same against the window to be wiped.

Figure 5:
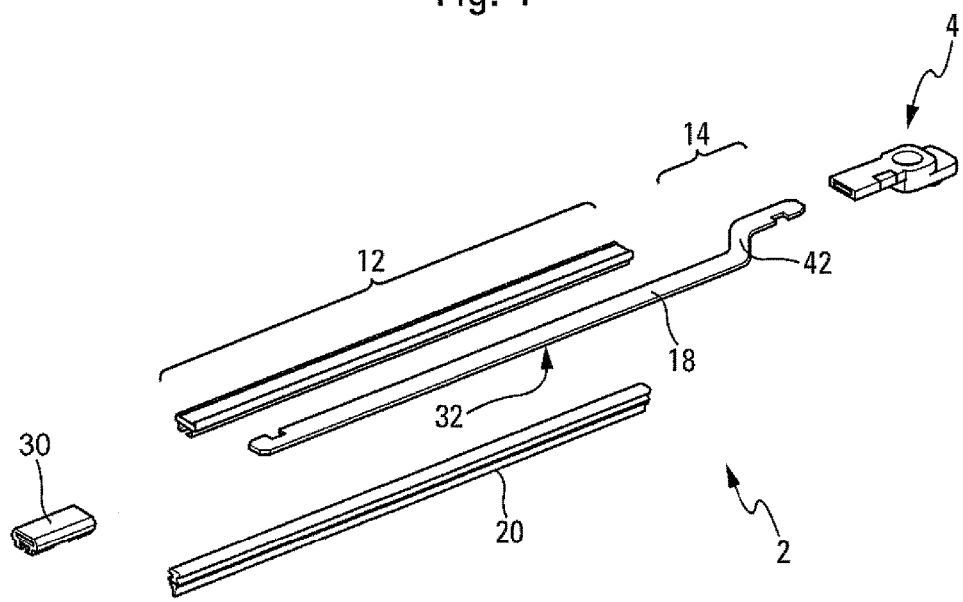
FIG. 5 is an exploded perspective view of different components of a wiper assembly according to a second embodiment of the invention.

In a second embodiment, shown in FIG. 5, the arm providing a spring function is an oblique branch 42, axially linking the first portion 32 of the stiffening element of the wiper and the attachment wall 35 to the drive head. Advantageously, the oblique branch has an incline in relation to the plane containing the attachment portion, with an angle substantially equal to 45°. Again, the oblique branch is oriented such that the attachment wall is arranged on the side of the stiffening element of the wiper that is opposite the wiper blade. Thus, when the blade and the stiffening element of the wiper are in position in the supporting element, the second portion extends above the rest of the wiper.

The size and incline of this oblique branch are also dimensioned to flex the arm such that said arm transmits a force to the wiper towards the window, to ensure efficient wiping.

Figure 3:
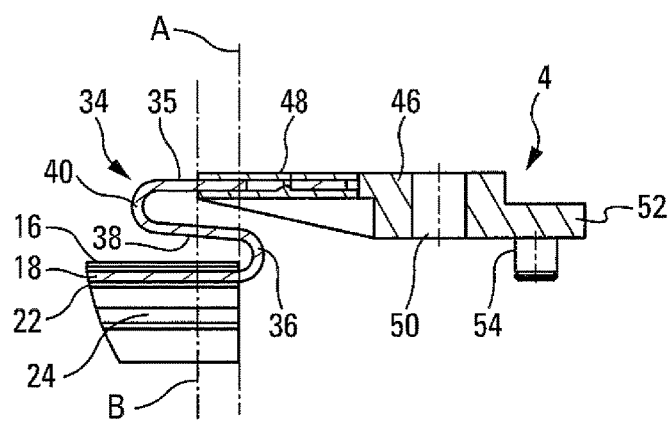
FIG. 3 is a cross sectional view, in the plane III-III shown in FIG. 2, of a detail of the wiper assembly.

It can be seen that the difference between the two embodiments lies in the fact that the "S" shape of the arm in the first embodiment means that the proximal axial extremity of the wiper extends beneath the drive head, which, as shown in FIGS. 1 and 3, enables said extremity of the blade to clean a zone of the window that is not normally accessible by the wiper when same is connected at one of the extremities of same to a drive head on the drive shaft.

In both embodiments, the free extremities of the stiffening element of the wiper are bevelled to facilitate insertion of the stiffening element of the wiper into the cavity of the supporting element at one extremity and insertion into the drive head at the other extremity. Furthermore, there is a transverse notch 44 at each axial extremity formed in one of the longitudinal edges of the stiffening element of the wiper, to enable the stiffening element of the blade to be clicked into the corresponding means.

At the distal extremity of the wiper, the fitting 30 arranged at the distal extremity of the wiper cooperates with the transverse notch 44 formed at the corresponding axial extremity of the stiffening element of the wiper if same projects from the supporting element, as described above. In a variant not shown, the extremities of the stiffening element of the wiper and of the wiper blade may be flush with the extremity of the supporting element and the fitting may simply be fitted about the supporting element with no direct cooperation with the stiffening element or elements of the blade. In this case, the cavity of the supporting element contains means designed to cooperate with the transverse notch of the stiffening element of the blade.

At the proximal extremity of the wiper, in both of the embodiments described above, the free extremity of the connection wall cooperates with the drive head 4, which has an axial body 46 and a lateral arm 48 radially extending the axial body.

The axial body has a bore 50, in this case a through-hole, designed to receive one extremity of the drive shaft 6 arranged at the output of the drive motor of the windscreen wiper. Means are provided for rigidly connecting the shaft in the bore of the axial body, and said means may be a key system or a fluting system, or for example adjustment means ensuring a forced fit between the two elements.

The body also includes a leg 52 that radially extends the axial body. This leg preferably includes a guide pin 54 that projects from the internal face of the leg to cooperate with a guide path formed in a structural element of the vehicle (not shown). The fact that the leg is diametrically opposite the lateral arm enables same to act as a stop, preventing the drive head from tilting in response to the stresses generated on the head by the arm providing a spring function. Indeed, while the arm is helping to press the blade against the window, this latter generates a return force on the wiper and on the stiffening element of the wiper, such that the spring portion can create a force pressing the drive head away from the window being wiped. The torque created is then compensated by the contact of the leg 52 with the structural element.

The lateral arm 48 has a receiving seat 56 for the proximal longitudinal extremity of the stiffening element of the wiper. As shown in FIG. 4, a clip 58 is provided inside the receiving seat to cooperate with the transverse notch in the extremity of the stiffening element of the wiper. This clip projects into the seat in the idle position such that it is elastically returned to a released position enabling insertion of the stiffening element of the wiper and the elasticity of the clip returns same to the initial position, engaged in the notch, such that the stiffening element of the wiper cannot be released.

In the case described, in which the assembly of the stiffening element of the wiper in the drive head is irreversible, the user wishing to replace the wiper removes the assembly including the wiper and the drive head by disengaging the latter from the drive shaft, then puts a new head on the shaft before rigidly connecting a new wiper on the head. In after-sales service, the wiper assembly including a wiper according to either one of the embodiments and a drive head are sold.

The clip provided in the receiving seat to cooperate with the notch of the stiffening element of the wiper could be designed to enable the reversible mounting of the stiffening element of the wiper in the drive head, in which case the user can leave the drive head on the drive shaft and replace only the wiper on each occasion.

Figure 2:
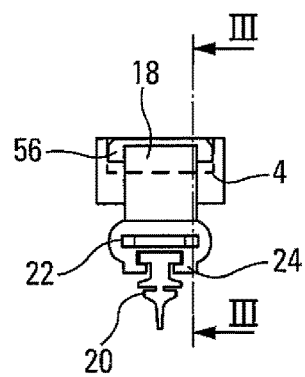
FIG. 2 is a side view of the wiper assembly shown in FIG. 1.

In the assembled position shown in FIGS. 2 to 4, in which the wiper is mounted on the drive head by clicking the proximal longitudinal extremity of the stiffening element of the wiper, a portion of the wiper extends beneath the lateral arm of the drive head due to the curved shape of the connection portion of the wiper.

The description above clearly explains how the invention achieves the objectives set, notably to provide a wiper assembly that covers a large wiping surface using a wiper applied correctly to the window to be wiped, all with a simple design and a limited number of components.

All of these advantages are achieved through the design of the curved proximal extremity of the wiper, and notably in the cooperation between same and the adapted drive head.

The shape and orientation of the curve provides an extremity of the wiper blade that extends beneath the drive head, thereby covering a zone of the window that is conventionally not cleaned in the windows on the rear of vehicles.

Furthermore, this shape provides an elastic effect tending to return the wiper to the original position of same, pressed against the window to be wiped, with a pressure applied substantially vertically, from top to bottom, which ensures that the wiper is properly pressed.

Naturally, different modifications can be made by a person skilled in the art to the structures of the wiper assembly, which are described above by way of non-limiting examples, provided that the design principle described above is retained, in which a component of simple shape provides the spring function pressing the connection arm to the drive head, same being formed in the stiffening element of the wiper. The "S" shape described here may therefore be changed, provided that it performs both functions, namely: wiping beneath the drive head and correctly pressing the wiper against the window to be wiped.

In a variant not shown, an accessory can be attached to the longitudinal supporting element, and this accessory may advantageously be an aerodynamic deflector including a fluid distribution and projection device comprising two longitudinal channels pierced with holes to enable a washer fluid to be projected, for example onto a window of the vehicle. In this case, the supporting element would include a longitudinal rib designed to be inserted in a seat of matching shape. Where required, this rib is used to stiffen the aerodynamic deflector, formed by extrusion independent of the supporting element, following assembly on the supporting element.

The invention of claimed is:

1. A wiper of a window of a motor vehicle, comprising:
    a wiper portion and a connection portion to a drive mechanism of the wiper, said wiper portion comprising a supporting element that is attached to a wiper blade of the window and that contains a stiffening element of the wiper,
    wherein,
    the connection portion is arranged as an extension of a proximal axial extremity of the wiper portion,
    the stiffening element is a rod preformed to have a flat first portion extending from the connection portion to a distal axial extremity of the stiffening member and is seated in the supporting element in the wiper portion of the wiper, and a second portion that forms said connection portion between said wiper and said drive mechanism,
    the second portion of the stiffening element of the wiper has a spring arm and an attachment wall, and
    the spring arm is the stiffening element of the wiper, folded about itself such that the second portion of the stiffening element of the wiper is "S" shaped and includes a first curved return portion that is a semi-circle extended by an intermediate wall partially overlapping and parallel to said flat first portion, the opposite extremity of said intermediate wall having a second curved return portion that is a semi-circle extended by said attachment wall, the intermediate wall being arranged between the first portion of the stiffening element of the wiper and the attachment wall.

2. The wiper according to claim 1, wherein the second portion of the stiffening element of the wiper is oriented such that the intermediate wall and the attachment wall are arranged on the side of the stiffening element of the wiper that is opposite the wiper blade.

3. The wiper according to claim 1, wherein one of the axial extremities of the stiffening element of the wiper includes attachment means to the drive mechanism.

4. The wiper according to claim 3, wherein the attachment means include a notch formed in the attachment wall.

5. The wiper according to claim 1, wherein, at a distal extremity of the wiper opposite said proximal extremity, the blade and the stiffening element of the wiper have axial extremities positioned substantially facing one another, and wherein an assembly fitting attaches the blade and the stiffening element to said distal extremity.

6. The wiper according to claim 1, wherein the supporting element is made of extruded plastic(s).

7. The wiper according to claim 1, wherein the supporting element includes at least one cavity, containing the stiffening element of the wiper, and a claw holding the wiper blade, the cavity and the claw extending longitudinally along the entire length of the supporting element, with the claw extending in line with the cavity.

8. The wiper according to claim 7, wherein the cavity has a substantially rectangular cross section that fits the cross section of the stiffening element of the wiper.

9. The wiper according to claim 7, wherein the claw comprises two legs that are formed from a wall of the supporting element and project in a direction perpendicular to the wall of the supporting element and whose free extremities extend towards the inside of the claw in a plane parallel to the wall of the supporting element.

10. A wiper assembly comprising:
    a drive head mounted on a motorized drive shaft, wherein the drive head comprises a complementary attachment point; and
    a wiper according to claim 1, in which the connection portion axially extending the wiper cooperates with the complementary attachment point of the drive head.

11. The wiper assembly according to claim 10, wherein the spring arm that axially extends the wiper is "S" shaped, such that the wiper extends at least partially in line with and beneath the drive head.

12. The wiper assembly according to claim 10, wherein the drive head includes an axial body for receiving the drive shaft and a lateral arm radially extending the axial body and having a receiving seat for the proximal longitudinal extremity of the stiffening element of the wiper, in which a clip is provided to cooperate with a transverse notch in the end of the stiffening element of the wiper.

13. The wiper assembly according to claim 12, wherein said axial body also includes a leg that is diametrically opposite the lateral arm.

14. The wiper assembly according to claim 10, wherein the clip irreversibly attaches the wiper to the drive head.

15. The wiper assembly according to claim 10, wherein the attachment wall extends parallel to the wiper portion of the wiper.

16. The wiper according to claim 1, wherein the attachment wall extends parallel to the wiper portion of the wiper.

* * * * *